(12) United States Patent
Boeck et al.

(10) Patent No.: US 9,932,847 B2
(45) Date of Patent: Apr. 3, 2018

(54) GUIDE BLADE FOR A GAS TURBINE

(71) Applicant: MTU Aero Engines AG, Munich (DE)

(72) Inventors: Alexander Boeck, Kottgeisering (DE);
Franz Malzacher, Groebenzell (DE)

(73) Assignee: MTU Aero Engines AG, Munich (DE)

( * ) Notice: Subject to any disclaimer, the term of this patent is extended or adjusted under 35 U.S.C. 154(b) by 337 days.

(21) Appl. No.: 14/812,218

(22) Filed: Jul. 29, 2015

(65) Prior Publication Data

US 2016/0032748 A1   Feb. 4, 2016

(30) Foreign Application Priority Data

Jul. 30, 2014 (DE) .......................... 10 2014 214 914

(51) Int. Cl.
*F01D 17/16* (2006.01)
*F01D 11/00* (2006.01)
(Continued)

(52) U.S. Cl.
CPC ............ *F01D 11/005* (2013.01); *F01D 9/041* (2013.01); *F01D 9/065* (2013.01); *F01D 11/003* (2013.01); *F01D 17/14* (2013.01); *F01D 17/162* (2013.01); *F01D 25/12* (2013.01); *F01D 25/24* (2013.01); *F16J 15/48* (2013.01); *F05D 2220/323* (2013.01); *F05D 2220/329* (2013.01); *F05D 2240/12* (2013.01); *F05D 2240/55* (2013.01); *F05D 2240/57* (2013.01); *F05D 2260/97* (2013.01)

(58) Field of Classification Search
CPC ........ F01D 11/005; F01D 9/065; F01D 17/14; F01D 17/162; F16J 15/48
See application file for complete search history.

(56) References Cited

U.S. PATENT DOCUMENTS 3,101,926 A   8/1963   Weber
3,117,716 A   1/1964   Wernicke
(Continued)

FOREIGN PATENT DOCUMENTS

EP   2 071 135 A1   6/2009
FR   1 182 583 A    6/1959

OTHER PUBLICATIONS

European Search Report issued in European counterpart application No. 15176267.1-1610 dated Jan. 4, 2016, with Statement of Relevancy (Ten (10) pages).

*Primary Examiner* — Logan Kraft
*Assistant Examiner* — Sabbir Hasan
(74) *Attorney, Agent, or Firm* — Crowell & Moring LLP

(57) ABSTRACT

A guide blade for a gas turbine is disclosed. The guide blade includes a blade leaf having a receptacle in which at least one sealing element is arranged, where the sealing element is movable relative to the blade leaf between a sealing setting, in which the sealing element is at least partially moved out of the receptacle, and a storage setting, in which the sealing element is moved back into the receptacle. The guide blade further includes at least one fluid channel by which fluid under pressure can be routed into the receptacle in order to move the sealing element from the storage setting into the sealing setting. An inlet opening of the fluid channel is formed on a pressure-side surface of the blade leaf. A housing as well as a gas turbine having at least one guide blade is also disclosed.

10 Claims, 3 Drawing Sheets

(51) Int. Cl.
*F01D 9/04* (2006.01)
*F01D 9/06* (2006.01)
*F01D 17/14* (2006.01)
*F01D 25/12* (2006.01)
*F01D 25/24* (2006.01)
*F16J 15/48* (2006.01)

(56) References Cited

U.S. PATENT DOCUMENTS

| | | | |
|---|---|---|---|
| 3,601,497 A | | 8/1971 | Mayo, Jr. |
| 3,645,645 A | | 2/1972 | Gammill et al. |
| 4,193,738 A | * | 3/1980 | Landis, Jr. ............ F01D 11/005 277/387 |
| 5,752,802 A | * | 5/1998 | Jones ..................... F01D 5/20 415/170.1 |
| 8,105,018 B2 | * | 1/2012 | Gockel .................. F02C 7/275 415/122.1 |
| 2009/0074563 A1 | * | 3/2009 | McCaffrey ............. F01D 11/08 415/115 |

* cited by examiner

GUIDE BLADE FOR A GAS TURBINE

This application claims the priority of German Patent Application No. DE 10 2014 214 914.2, filed Jul. 30, 2014, the disclosure of which is expressly incorporated by reference herein.

BACKGROUND AND SUMMARY OF THE INVENTION

The present invention relates to a guide blade for a gas turbine, particularly of an aircraft engine.

Guide blades for gas turbines in various designs are known from the prior art. Guide blades are mounted in a housing of a gas turbine such that the blade leaf of each guide blade is arranged in a flow channel of the housing of the gas turbine and modifies the flow of a downstream rotor. This can increase the efficiency of the gas turbine. One problem here is the gaps between the blade leaves and the neighboring housing components adjoining the flow channel or the annular space. These gaps lead to flow losses that can even completely offset the potential increase in efficiency.

Thus, U.S. Patent Application Publication No. 2009/0074563 A1 discloses guide blades equipped with respective sealing elements. The sealing elements are arranged in front receptacles of the blade leaves and can be adjusted between a sealing setting, in which the sealing element is moved out of the receptacle, at least in certain areas, to reduce flow leaks between the blade leaf and an adjacent housing part, and a storage setting, in which the sealing element is moved back into the receptacle opposite the sealing setting. Guide blades are formed to be hollow on the inside, and cooling air flows through them during operation of the assigned gas turbine. A partition wall, breached by a plurality of fluid channels, is located between the interior hollow space of the guide blades and the front receptacle. Part of the cooling air is routed into the receptacle via these fluid channels, whereby the sealing element is moved radially to the outside from the storage setting into the sealing setting in order to reduce the so-called flag gap between the blade end of the blade leaf and the adjacent housing component.

What can be considered disadvantageous with the known guide blades is the fact that only hollow or internally cooled guide blades can be equipped with movable sealing elements in this manner. Furthermore, the cooling air used exerts comparably high pressure, as a matter of principle, on the sealing element, whereby it is subjected to unnecessarily high wear.

The object of the present invention is to provide a guide blade of the aforementioned type that enables more flexible and improved sealing of the gap. Additional objects of the invention are to provide a housing for a gas turbine with at least one such guide blade as well as a gas turbine with at least one such guide blade.

A guide blade enabling more flexible and improved gap sealing is obtained according to a first aspect of the invention in that an inlet opening of the fluid channel is formed on a pressure-side surface of the blade leaf. In other words, according to the invention, the fluid channel does not extend within the blade leaf between a cooling space and the receptacle but rather the fluid channel fluidly connects the receptacle to the pressure-side surface of the blade leaf. This means that guide blades both cooled on the inside and not cooled can be equipped with the adjustable sealing element. Furthermore, previously existing guide blades without such type of receptacles and sealing elements can also be retrofitted easily, because only the receptacle is placed into the guide blade and connected with the pressure-side surface of the blade leaf via the fluid channel. During operation of an assigned gas turbine, a flow of fluid is driven out within the receptacle of the blade leaf, and this fluid also works against the force of gravity from the receptacle to move the sealing element into the sealing setting or in contact with an adjacent component and thus leads to a reduction in or even a complete sealing of the flag gap with a corresponding increase in efficiency. Due to the comparatively low press-on forces that result only from the pressure difference via the guide blade itself, the wear of the sealing element in this case is additionally significantly reduced. The sealing element in this case is preferably formed as a sealing plate.

Other advantages result from the guide blade being formed as a variable guide blade. Variably adjustable guide blades, that is guide blades that can be adjusted opposite the housing or rotated around a rotational axis of the guide blade, enable particularly the optimizing of the absorption capacity of the gas turbine for different operating points, whereby the fuel consumption can be greatly reduced for a task, that is for the sequencing of different operating points. Due to the comparatively low press-on forces on the sealing element that result only from the pressure difference via the guide blade itself, the wear of the sealing element in this case is particularly significantly reduced for a guide blade formed as a variable guide blade. In comparison to conventional, adjustable guide blades, which do not have a moving sealing element, the guide blade according to the invention has significant advantages. With a conventional adjustable guide blade, special contours or recesses must be placed in that section of wall of the flow channel opposite the flag of the adjustable guide blade in order to keep the flag gap for each setting of the adjustable guide blade within an acceptable range.

Such type of contours or recesses in the wall of the flow channel, however, represent a deviation from the ideal wall profile for the flow of the operating medium of the gas turbine and thus lead to a reduction in the efficiency of the gas turbine. Due to the adjustable guide blade according to the invention, such type of contours or recesses can be dispensed with advantageously, because the movable sealing element can, at least to a great extent, always be placed at the contour of the adjacent wall of the flow channel optimum for the flow. Furthermore, with the adjustable guide blade according to the invention, it does not matter whether the size of the flag gap changes due to changing thermal conditions in the gas turbine. The movable sealing element can be placed, at least approximately, at the adjacent wall of the flow channel, independently of the size of the flag gap, and thus, at least to a great extent, close the flag gap.

In a further advantageous embodiment of the invention, it is provided for the inlet opening of the fluid channel to be formed, when considered in the flow direction, downstream of a rotational axis of the variable guide blade. This ensures sufficient press-on forces for the sealing element in all operating positions of the guide blade.

A particularly high sealing effect is enabled in a further embodiment of the invention in that the receptacle, when considered in the flow direction, is downstream of a pin adjoining the blade leaf in the radial direction.

Further advantages result when the receptacle is designed such that an outlet opening of the fluid channel feeding into the receptacle cannot be fully covered by the sealing element. In other words, a provision is that the receptacle and the sealing element are adapted to one another such that the sealing element cannot prevent a flow of the fluid under pressure from the fluid channel into the receptacle, regardless of its setting. This ensures that the sealing element is always subject to a certain amount of minimum pressure during operation of the assigned gas turbine. For example, the sealing element or the receptacle may be roof-shaped for this or have a projection, so that the outlet opening of the fluid channel cannot be completely closed off by the sealing element. Alternatively or in addition, the sealing element may have a recess, which comes to rest in the area of the outlet opening of the fluid channel when the sealing element is moved into the storage setting.

Further advantages result in that a main axis of the fluid channel is arranged at least essentially at a right angle to a main axis of the receptacle. In other words, a provision is that the fluid channel and the receptacle are arranged relative with respect to one another such that the fluid under pressure flows through the fluid channel into the receptacle and is diverted in the receptacle at an angle of about 80°-100°. This ensures the most even impact of pressure possible of the sealing element arranged in the receptacle.

Further advantages result in that the guide blade according to the invention is formed as a compressor blade and/or as a turbine guide blade. In other words, the sealing design according to the invention can be implemented in a compressor or in a turbine of a gas turbine.

A further aspect of the invention relates to a housing for a gas turbine, in which the housing has a flow channel, in which a blade leaf of at least one guide blade is arranged, in which at least one sealing element is arranged, which can be moved, relative to the blade leaf, between a sealing setting, in which the sealing element is moved out of the receptacle, at least in certain areas, to reduce flow leaks between the blade leaf and an adjacent housing part bordering the flow channel, and a storage setting, in which the sealing element is moved back into the receptacle opposite the sealing setting of the adjacent housing component, and in which the guide blade includes at least one fluid channel, by which fluid under pressure can be guided into the receptacle in order to move the sealing element out of the storage setting and into the sealing setting. According to the invention, a provision is that the at least one guide blade be formed according to the first aspect of the invention. The resulting features and the advantages thereof are contained in the descriptions of the first aspect of the invention, in which advantageous embodiments of the first aspect of the invention can be considered advantageous embodiments of the second aspect of the invention. On the other hand, advantageous embodiments of the second aspect of the invention can be considered advantageous embodiments of the first aspect of the invention.

In an advantageous embodiment of the invention, a provision is that the sealing element of the guide blade be formed such that the sealing element makes contact with an adjoining housing component in the sealing setting and is arranged underneath the outlet opening of the fluid channel feeding into the receptacle, in the radial direction of the guide blade. During operation of an assigned gas turbine, it is hereby ensured that the sealing element in the sealing setting is subjected to a defined minimum pressure and is reliably maintained in the sealing setting. In this context, the term "makes contact with" can also be understood to mean that a very small residual gap remains between the sealing element and the housing component bordering it, through which a small amount of leakage flow can exit. In this case, the sealing element would not completely seal off the gap, but the flow would be significantly throttled by the flag gap. The residual gap in this case probably has a gap height that is no more than a fourth, or more preferably no more than an eighth, or even more preferably no more than a tenth the gap height of the flag gap that would exist without the presence of the sealing element according to the invention between the guide blade and the housing component opposite the guide blade. Due to the fact that a small residual gap remains, the sealing element quasi-floats on an air cushion, which means that direct friction contact is prevented between the sealing element and the housing component when the guide blade is adjusted, which facilitates the adjustment process and prevents wear caused by friction.

A third aspect of the invention relates to a gas turbine, particularly an aircraft engine, for example for an airplane, a helicopter, a drone, or another flying device, having at least one guide blade according to the first aspect of the invention, and/or with at least one housing according to the second aspect of the invention. The resulting features and the advantages thereof are contained in the descriptions of the first and/or the second aspect of the invention, in which advantageous embodiments of the first and/or of the second aspect of the invention can be considered advantageous embodiments of the third aspect of the invention.

Additional features of the invention result from the claims, the exemplary embodiment, and the drawings. The features and feature combinations listed previously in the description as well as the features and feature combinations listed in the exemplary embodiment in the following can be used not only in the respectively indicated combinations, but also in other combinations, without going beyond the scope of the invention.

DETAILED DESCRIPTION OF THE DRAWINGS

Figure 1:
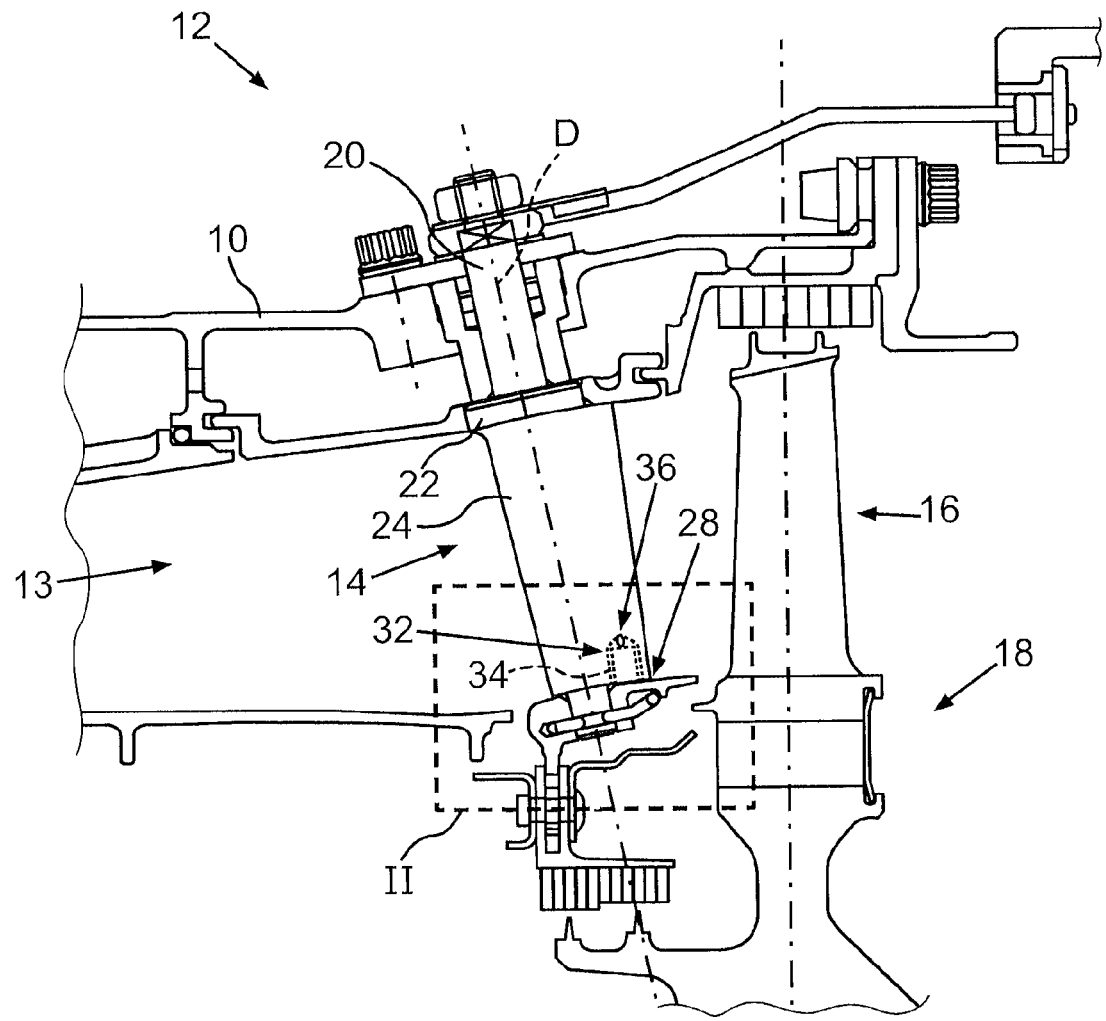
FIG. 1 shows a schematic sectional view through a housing of a gas turbine, in which a guide blade and a rotor blade of a rotor can be seen.
Figure 2:
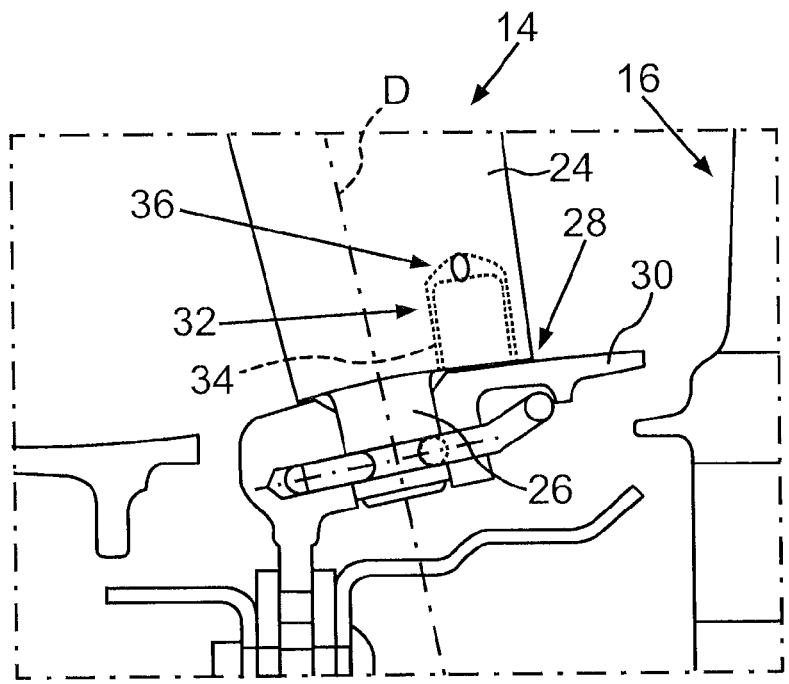
FIG. 2 shows a schematic sectional view of detail II shown in FIG. 1.

FIG. 1 shows a schematic sectional view through a housing 10 of a gas turbine 12, in which an example of a guide blade 14 according to the invention and a downstream rotor blade 16 of a rotor 18 are shown. FIG. 1 shows, when viewed together with FIG. 2, what a schematic sectional view of detail II shows in the following. It can be seen that the guide blade 14, in the exemplary embodiment shown, is formed as a variable guide blade 14 and can be rotated around a rotational axis D. For this purpose, the guide blade 14 includes a radially outer shaft 20, which is housed within the housing 10 so as to rotate. A blade disk 22 and a blade leaf 24 connect at the shaft in the radial direction, in which the blade leaf 24 is arranged in a flow channel 13 of the housing 10. A pin 26, by which the guide blade 14 is also housed in the housing 10 so as to rotate, is located radially underneath the end of the blade of the blade leaf 24.

In order to seal off a gap 28 between the radially lower front of the blade leaf 24 and the adjacent housing component 30 formed as an annular space segment, the guide blade 14 has a receptacle 32 in the blade leaf 24, in which a sealing element 34 is arranged, which is present as a sealing plate. The sealing element 34 can be moved in the receptacle 32 into a sealing setting relative with respect to the blade leaf 24, in which the sealing element 34 is moved partially out of the receptacle 32 in order to reduce leakage flows through the gap 28 between the blade leaf 24 and the adjacent housing component 30 and makes contact with the housing component 30. On the other hand, the sealing element 34 can be moved into the receptacle 32 in a storage setting, whereby the gap 28 is at least partially exposed.

Figure 3:
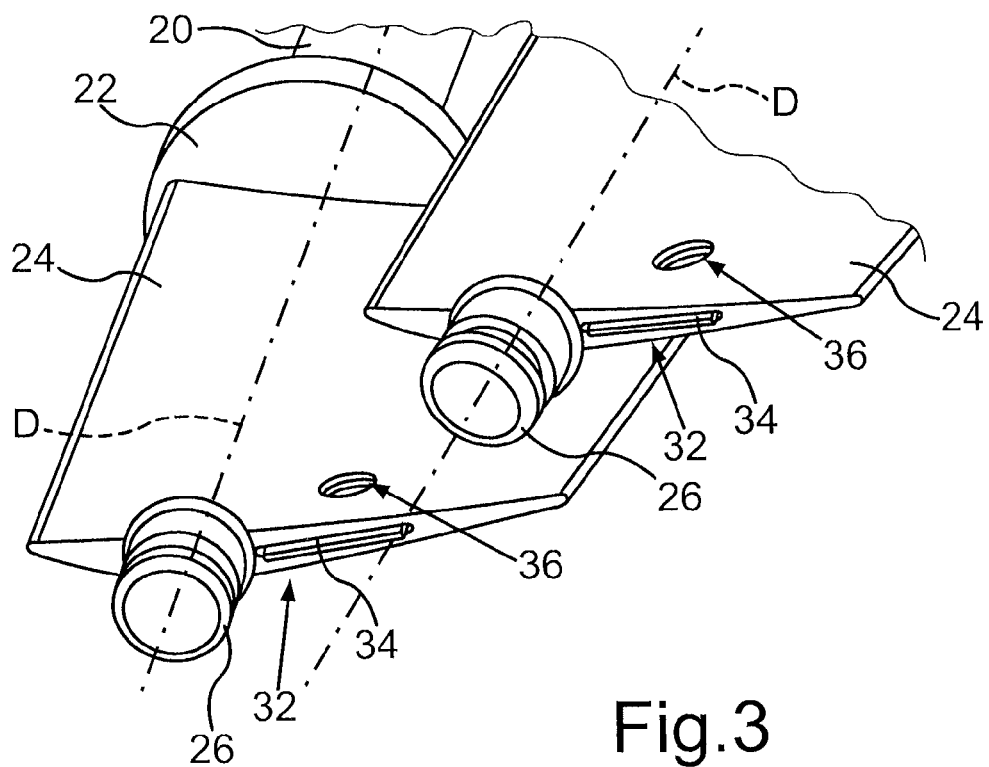
FIG. 3 shows a schematic and cutout perspective view of two guide blades according to the invention.
Figure 4:
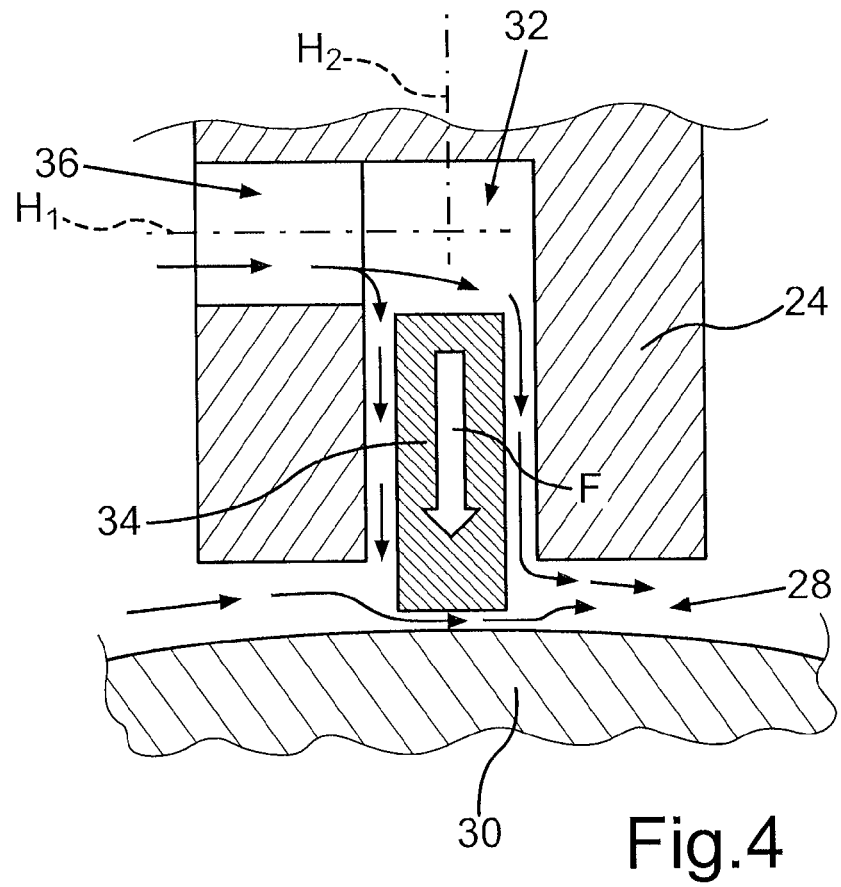
FIG. 4 shows a schematic sectional view of a receptacle equipped with the sealing element of the guide blade according to the invention.

In order to move the sealing element 34 into the sealing setting, a fluid channel 36 is provided, by which fluid that is under pressure during operation of the gas turbine 12 is routed into the receptacle 32. As can especially be seen in FIGS. 3 and 4, an inlet opening of the fluid channel 36 is formed on a pressure-side surface of the blade leaf 24. To this end, FIG. 3 shows a schematic and cutout perspective view of two guide blades 14 according to the invention, while FIG. 4 shows a schematic sectional view of the receptacle 32, equipped with a sealing element 34, of the guide blade 14 according to the invention. An opening of the fluid channel 36 is located downstream of the rotational axis D of the variable guide blade 14 as well as downstream of the pin 26, when considered in the flow direction of the operating fluid of the gas turbine 12. In addition, it is particularly obvious from FIG. 4 that a main axis H1 of the fluid channel 36 is arranged at least essentially at a right angle to a main axis H2 of the receptacle 32. This causes the fluid under pressure to flow at a right angle into the receptacle 32, in which it is rerouted and presses the sealing element 34 into the sealing setting with a press-on force F. This is indicated in FIG. 4 with the corresponding arrows. It is further indicated in FIG. 4 that a radial upper edge of the sealing element 34 is arranged at the height of the bottom of the fluid channel 36, in the sealing setting. This means that the fluid channel 36 is completely released, so that the entire fluid volume is routed to the sealing element 34. The press-on force F in this case is primarily effected by the pressure difference by the guide blade 14. Based on a clearance fit of the sealing element 34, the fluid flows laterally past the sealing element 34 from the receptacle 32 into the gap 28. Essentially, the receptacle 32 can be supplied with fluid under pressure via multiple fluid channels 36. One individual fluid channel 36 is, however, normally sufficient and has the advantage of the least possible structural weakening of the blade leaf 24.

Due to the comparably low press-on force F of the sealing element 34 moving into the sealing position, the guide blade 14 remains adjustable, while wear of the sealing element 34 is minimized simultaneously. Thus, the gap 28 is at least partially sealed off, whereby the throttle losses are reduced and the level of efficiency of the gas turbine 12 is increased. The sealing design presently shown by the turbine guide blade can also be used in a compressor of a gas turbine 12 or in a compressor guide blade.

Figure 5:
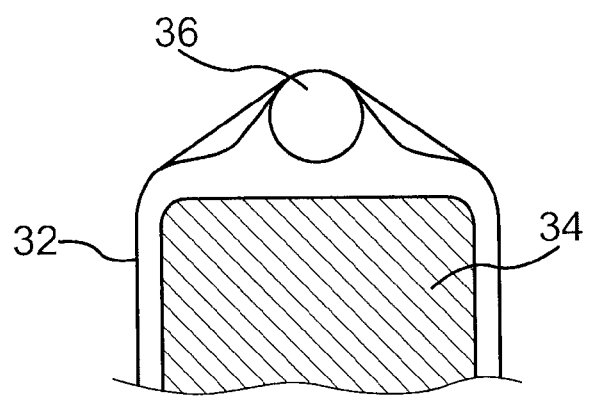
FIG. 5 shows a schematic side view of an alternative embodiment of the receptacle, in which the sealing element is arranged.

FIG. 5 shows a schematic side view of an alternative embodiment of the receptacle 32, in which the sealing element 34 is arranged. One can see that the receptacle 32 is formed in the shape of a roof in the exemplary embodiment shown, so that the essentially square-shape sealing element 34 cannot completely cover the fluid channel 36 arranged in the roof-shaped area, even in the storage setting. This ensures that the sealing element 34 is always subjected to a certain minimum amount of pressure, which exerts targeted force onto the sealing element 34 in the direction of the sealing setting, during operation of the assigned gas turbine.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A guide blade for a gas turbine, comprising
   a blade leaf with a receptacle, wherein a sealing element is disposed in the receptacle, wherein the sealing element is movable relative to the blade leaf between a sealing setting in which the sealing element is disposed at least partially out of the receptacle and a storage setting in which the sealing element is disposed in the receptacle;
   wherein the blade leaf has a fluid channel, wherein a fluid under pressure is routable into the receptacle via the fluid channel in order to move the sealing element from the storage setting to the sealing setting;
   and wherein an inlet opening of the fluid channel is formed on a pressure-side surface of the blade leaf.

2. The guide blade according to claim 1, wherein the guide blade is a variable guide blade.

3. The guide blade according to claim 2, wherein the inlet opening of the fluid channel is formed downstream of a rotational axis of the variable guide blade in a flow direction.

4. The guide blade according to claim 1, wherein the receptacle is disposed downstream of a pin in a flow direction and wherein the pin is adjacent to the blade leaf in a radial direction.

5. The guide blade according to claim 1, wherein the receptacle is formed such that an outlet opening of the fluid channel that feeds into the receptacle is not completely covered by the sealing element.

6. The guide blade according to claim 1, wherein a main centrally located axis of the fluid channel is disposed essentially at a right angle with respect to a main centrally located axis of the receptacle.

7. The guide blade according to claim 1, wherein the guide blade is a compressor guide blade or a turbine guide blade.

8. A housing for a gas turbine, comprising:
   a flow channel; and
   a guide blade according to claim 1 disposed in the flow channel.

9. The housing according to claim 8, wherein the sealing element makes contact with an adjoining housing component in the sealing setting and is disposed underneath an outlet opening of the fluid channel that feeds into the receptacle in a radial direction of the guide blade.

10. A gas turbine, comprising:
    a housing according to claim 8.

* * * * *